United States Patent
Arai et al.

(10) Patent No.: US 7,035,850 B2
(45) Date of Patent: Apr. 25, 2006

(54) ACCESS CONTROL SYSTEM

(75) Inventors: Masato Arai, Tokyo (JP); Toshinori Kajiura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 945 days.

(21) Appl. No.: 09/816,625

(22) Filed: Mar. 22, 2001

(65) Prior Publication Data

US 2001/0025311 A1 Sep. 27, 2001

(30) Foreign Application Priority Data

Mar. 22, 2000 (JP) ......................... 2000-084706

(51) Int. Cl.
*G06F 17/30* (2006.01)

(52) U.S. Cl. .................... 707/6; 707/1; 707/9; 707/10; 709/217; 709/225

(58) Field of Classification Search ............... 707/1–10, 707/100–104.1, 200–206; 709/217, 219, 709/225, 229; 711/100; 713/182; 715/741, 715/742, 743
See application file for complete search history.

(56) References Cited

U.S. PATENT DOCUMENTS

| | | | | |
|---|---|---|---|---|
| 6,105,027 A | * | 8/2000 | Schneider et al. | 707/9 |
| 6,122,631 A | * | 9/2000 | Berbec et al. | 707/9 |
| 6,643,648 B1 | * | 11/2003 | Ross et al. | 707/9 |
| 6,654,864 B1 | * | 11/2003 | Shaath et al. | 711/163 |
| 6,697,806 B1 | * | 2/2004 | Cook | 707/10 |

FOREIGN PATENT DOCUMENTS

| | | |
|---|---|---|
| JP | 4171554 | 6/1992 |
| JP | 05-100939 | 4/1993 |
| JP | 08-044630 | 2/1996 |
| JP | 10069417 | 3/1998 |

OTHER PUBLICATIONS

Rubin, Craig, et al., "Virtual Vault White Paper," www.hp.com/security/products/virtualvault/papers/whitepaper_3.1 (®1994–1999 Hewlett–Packard Company).

Stein, Lincoln, "Web Security: A Step–by–Step Reference Guide," www.aw.com/cseng/titles/0–201–63489–9 (®1998 Addison–Wesley).

"Securing Your File with NTFS," *IIS Resource Guide* (volume of the *Microsoft Windows 2000 Server Resource Kit*) from *Microsoft Internet Information Server* 4.0 (® 1997–1999 Microsoft Corporation).

* cited by examiner

*Primary Examiner*—Shahid Alam
*Assistant Examiner*—Jean Bolte Fleurantin
(74) *Attorney, Agent, or Firm*—Townsend and Townsend and Crew LLP

(57) ABSTRACT

An access control system and its method that can prevent access to read or write into a file, no matter what user right the access request source uses to attempt an unauthorized access. This invention uses a policy that access to a specific file is authorized only when it is made by a specific user using a specific program. In addition, the policy is registered in a policy file 200 and the access information hooked by a file I/O hook program 106 is transmitted through an inter-OS communication processor 108 to an access control program 110 for a security OS 104 in order to perform access control according to said policy.

11 Claims, 17 Drawing Sheets

100: Server information processing unit    120: Client information processing unit
101: Memory under the control of service OS
102: Memory nuder the control of security OS

FIG.2

200: Policy file

| Object name (201) | Prohibited access type (202) | Error code (203) | Exception subject (204) | Program hash value (205) | User name (206) |
|---|---|---|---|---|---|
| D:¥DOC¥SECRET.TXT (210) | Open | 0016 | C:¥prog¥wordedit.exe | 0x22F0A412B73209CC | sys_admin |
| | Delete | 0021 | C:¥prog¥fileman.exe | 0x73209C2F0A212B4C | sys_admin |
| D:¥SYS¥CONFIG¥* (211) | Write | 0018 | C:¥prog¥mantool.exe | 0xB74122209FDE236C | sys_admin |
| | Delete | 0021 | C:¥prog¥mantool.exe | 0xB74122209FDE236C | sys_admin |
| D:¥LOG¥LOG.TXT (212) | Read | 0015 | C:¥prog¥audit.exe<br>C:¥prog¥vek.exe | 0x2F21204B73C09A2C<br>0xF0A271243B9C202C | root,<br>system |
| | Rename | 0024 | C:¥prog¥audit.exe | 0x2F21204B73C09A2C | root |

FIG.3

| Date/time | Object name | Access type | Subject name | User name |
|---|---|---|---|---|
| 1999.07.28 15:32:46 | D:￥DOC￥SECRET.TXT | Write | C:￥prog￥wwwsrv.exe | u_0023 |
| 1999.07.27 09:15:10 | D:￥DOC￥SECRET.TXT | Delete | C:￥prog￥wwwsrv.exe | u_0023 |
| 1999.07.25 16:02:55 | D:￥SYS￥CONFIG￥ | Write | C:￥prog￥txtedit.exe | intruder |
| 1999.07.25 14:44:28 | D:￥SYS￥CONFIG￥ | Delete | C:￥prog￥fileman.exe | intruder |
| 1999.07.25 14:42:59 | D:￥LOG￥LOG.TXT | Read | C:￥prog￥txtedit.exe | user007 |
| 1999.07.16 10:29:31 | D:￥LOG￥LOG.TXT | Delete | C:￥prog￥fileman.exe | user007 |

300: Access log file

501~506: Communication routes

600: I/O packet  630: Memory space of file I/O hook program
610: Request packet  640: Memory space of access control program
620: Response packet 701~702: An outline of the processing sequence for the server program 109

703~712: Processing sequence for the file I/O hook routine 400

801~812: Processing sequence for the open routine

901~908: Processing sequence for the open control routine 405

FIG.11

| Process ID | Subject name | User name | Object name | Authorized access type |
|---|---|---|---|---|
| 0022 | c:¥prog¥wwwserv.exe | inet | D:¥HOME¥SALES.HTML | Read |
| 0043 | c:¥prog¥wordedit.exe | sec_admin | D:¥DOC¥SECRET.TXT | Read/Write |
| 0067 | c:¥prog¥viewer.exe | tarou | D:¥DOC¥IDEA.TXT | Read |
| 0092 | c:¥prog¥mantool.exe | sys_admin | D:¥SYS¥CONFIG¥PORT | Read/Write |
| 0113 | c:¥prog¥vck.exe | system | D:¥DOC¥SHEET.DOC | Read |
| 0218 | c:¥prog¥audit.exe | root | D:¥LOG¥LOG.TXT | Read/Write |

1201~1203: Processing sequence for the close routine 402

1301~1306: Processing sequence for the read/write routine 403

1401~1403: Processing sequence for the access log registration routine 406

1501~1511: Processing sequence for the delete/rename routine 404

1601~1605: Processing sequence for the delete/rename control routine 407

ACCESS CONTROL SYSTEM

This application claims priority from Japanese Patent Application No. 2000-84706, filed Mar. 22, 2000, the entire content of which is incorporated herein by reference for all purposes.

BACKGROUND OF THE INVENTION

This invention relates to access control technology suitable for preventing unauthorized access to information under the control of information processing units.

In most ordinary computer systems, confidential data files are protected using a user authentication system incorporated in a multi-user multi-task OS and a file access control system based on results of the authentication. Specifically, each time an information processing unit in which the OS is installed is used, the user must enter their user ID and password for authentication. An access control list is allocated to every file under the control of the information processing unit as security attribute information where, for each access type (file read or write, etc.), the list defines users who are authorized to access the file using user IDs and group IDs. If the user accesses a file through an application program, the OS checks the ID of the user as the access request source, as well as the ID of the group he or she belongs to, against the access control list allocated to the file being accessed, and only when the list includes the user ID, is access authorized.

On the other hand, as a technique to transmit or collect information or provide various services through the Internet, the World Wide Web (WWW) is being widely used. In the WWW system, a communication protocol known as Hyper Text Transfer Protocol (HTTP) is used to transmit request data and response data. Also, in the WWW system, several security techniques are available to prevent illegal substitution of content or leakage of confidential information through the network.

Among the security systems provided by HTTP is what is called "Basic Authentication." In this basic authentication system, a user ID and a password are preregistered in the WWW server as authentication information, and a user ID and a password transmitted via a browser from the user are compared with the above authentication information to authenticate the user. A policy file which describes access rights to each content and an access control system based on the policy are also loaded in the WWW server. It is also possible to have the Common Gateway Interface (CGI) program incorporate a similar system for user authentication and control of access to contents.

In recent years, the number of illegal accesses utilizing security holes or bugs latent in Internet service programs and so on has been increasing. Information about these security holes and bugs is available from such sites as http://www.cert.org/and debugging programs are distributed by manufacturers. However, attackers or intruders use every possible technique for intrusion into information processing units from external networks, so a technique for more effective access control is needed.

SUMMARY OF THE INVENTION

This invention provides an access control system and method which, despite the authority an access request source (subject) may have, can restrict both the subject's access technique and the access objects. The invention also provides an access control system and method which can prevent illegal or unauthorized accesses. In addition, this invention provides an access control system and method which can protect a policy file in which established access rights are described, and a program which executes access control according to the policy file to prevent unauthorized accesses or attacks from outside.

To provide these functions, a preferred embodiment of this invention employs, as an access control policy, information which specifies an access request more precisely, that is, information which specifies an access request source (subject), access execution technique and access type. More particularly, an access control policy description file (policy file) is created which authorizes only a specific user to access a specific file using a specific program and, when an access to the file is attempted, an access controller determines the validity of the access and whether the access should be authorized, according to the description in the policy file. For each of such access types as file open, read, write, delete and rename, the access control policy prescribes combinations of the following: names of files to be accessed, and names of users and programs having access authorization.

To prevent illegal file access the information processing unit is equipped with a file I/O (Input/Output) hook processor. Upon detection of an access attempt, the file I/O hook processor obtains information on the access type, the name of the file to be accessed, the name of the user as the access request source and the program name, and transmits that information to the access controller. The access controller checks the received information against the policy file and if the access attempt is against the policy, invalidates the access and returns an error through the file I/O hook process to the access request source. In addition to the above, an exclusive controller protects the memory regions in use by the access controller and file I/O hook processor (monitoring processor) and shields the policy file from any access execution section other than the access controller and monitoring processor.

To protect the policy file and the access controller, two operating systems (OS) are installed on one information processing unit, and an inter-OS communication processor for data communications between the two operating systems is provided in the exclusive controller. Furthermore, memories, magnetic disks and network devices which the OSs occupy mutually exclusively also are provided.

One of the two operating systems is used as a service OS to be monitored for access, and the file I/O file hook processor is provided as a kernel level module for the service OS. The other OS is used as an OS for security and stored in the magnetic disk containing the access controller and the policy file, and the access controller is run as a process under the multiple-OS control program to make the access controller and policy file on the service OS inaccessible from the process which is used by the user as a recipient of the service.

In this description, the term "OS" refers generally to a program module which has a memory which it exclusively occupies, a function to execute access to data or a file in a storage medium according to a request from a user or program, and a function to identify the user or program as the access request source. The OS typically also has the following features:

Controls data (file) access and has an ability to detect.

Identifies the user as the access request source.

Identifies the application program as the access request source.

Therefore, this invention can be applied not only to what is generally called OS, but to other systems having the the features listed above. Programs required to embody this invention (also called codes, modules or units) may be introduced, in advance or when necessary, via a computer-readable medium from another server connected on the network, i.e., a transmission signal on the network, or via a portable storage medium such as CDROM or FD. These and other benefits are described throughout the present specification. A further understanding of the nature and advantages of the invention may be realized by reference to the remaining portions of the specification with reference to the attached drawings.

BRIEF DESCRIPTION OF THE DRAWINGS

FIG. 2 is a block diagram showing a policy file to store access control policy settings.

FIG. 3 is a block diagram showing an access log file to record illegal accesses.

FIG. 11 is a block diagram showing an example of data registered in the open file table.

DESCRIPTION OF THE PREFERRED EMBODIMENTS

Figure 1:
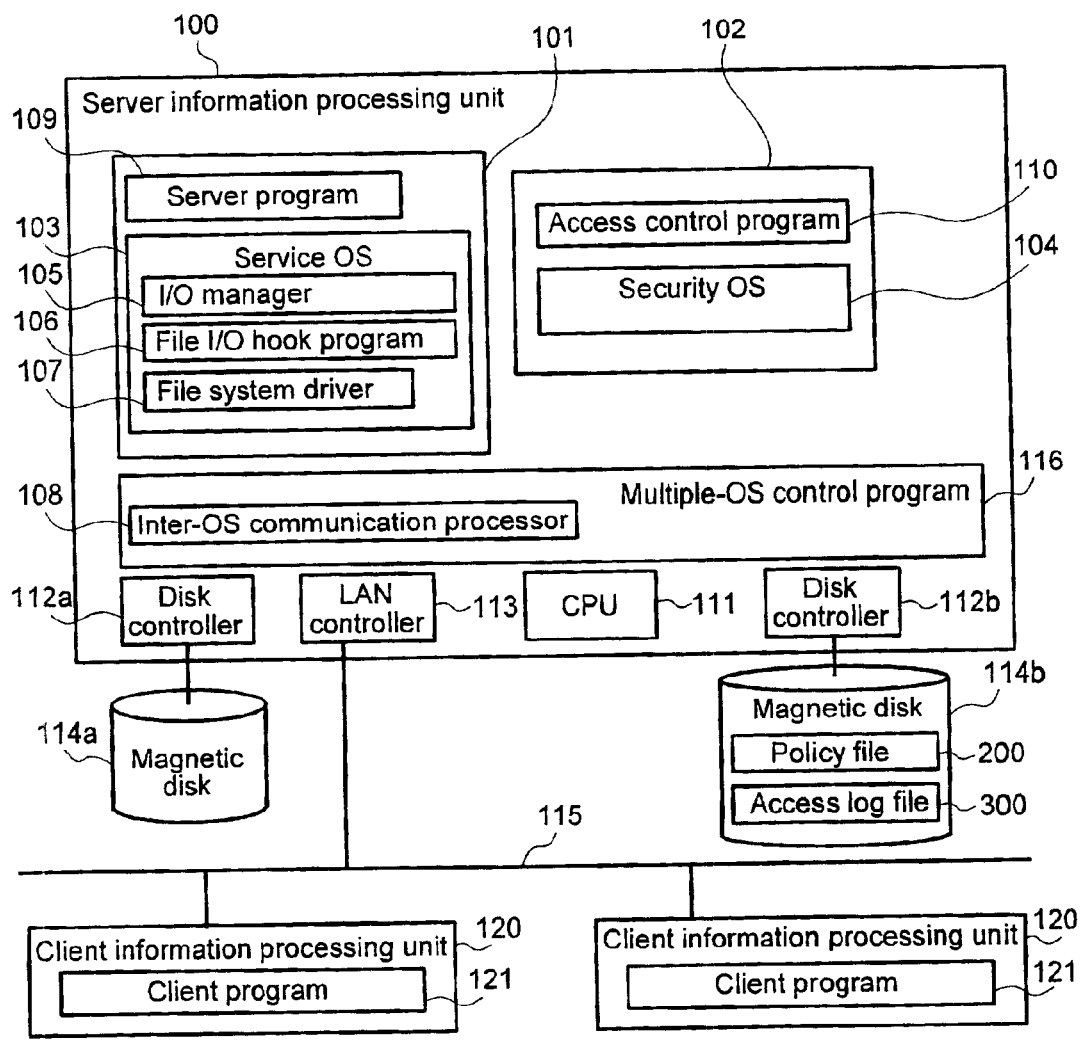
FIG. 1 is a block diagram showing an example of a structure of an access control system according to an embodiment of this invention.

As a solution to the problem of increasing illegal accesses using security holes and bugs latent in Internet service programs, etc., a technique for periodically checking files for damage through a resident file monitoring program installed on an information processing unit is disclosed in Japanese Published Unexamined Patent Application No. 1998-69417, the contents of which are incorporated herein by reference for all purposes. Similar techniques such as tools installed on an information processing unit through a program, to periodically check size variation and time stamps for a specific file, and to detect changes in the file, are available in the form of shareware or free ware.

Hereinafter some embodiments of the invention will be described. In the attached drawings parallel numbering is used so that like reference numerals represent like components, elements or processes.

FIG. 1 shows an example of a structure of an access control system according to a preferred embodiment of this invention. A server information processing unit 100 comprises: a memory 101 under the control of a service OS 103; a disk controller 112a, a magnetic disk 114a, and a LAN controller 113. Also shown is a memory 102 under the control of a security OS 104, a disk controller 112b and a magnetic disk 114b which are occupied by the security OS 104.

A multiple-OS control program 116 performs various control operations to run multiple operating systems (a service OS 103 and a security OS 104 in this embodiment) on the server information processing unit, including initialization and partitioning/occupation of various hardware units, scheduling of the CPU and interruption processing. An inter-OS communication processor 108, which resides in multiple-OS control program 116, provides a function for communications between the OSs running on the server information processing unit.

When the server information processing unit 100 is started up, the multiple-OS control program 116 initializes various hardware units and executes hardware partitioning/occupation for each OS and so on; and service OS 103 and a server program 109 are loaded through disk controller 112a from magnetic disk 114a to memory 101, and the security OS 104 and an access control program 110 are loaded through disk controller 112b from magnetic disk 114b to memory 102. Inter-OS communication processor 108 is an interface which is used to exchange data between a file I/O hook program and the access control program 110 and cannot be used directly from server program 109. One may also configure inter-OS communication processor 108 as an interprocess communication program included in service OS 103.

Like existing multiuser, multitask OSs which are available on the market, service OS 103 should have a function to identify and authenticate users. Server information processing unit 100 and multiple client information processing units 120 are interconnected through a Local Area Network (LAN) 115. Server program 109 receives a request from a client program 121 and sends a response to client program 121 through LAN controller 113 and LAN 115. Server program 109 and client program 121 correspond to, for example, a WWW server and a browser. It is also possible to connect the server information processing unit 100 and client information processing units 120 via telephone lines or the Internet instead of LAN. If the inter-OS communication interface is closed to the public, the service OS and security OS may be installed in different processing units, which causes no security problem.

An application program like server program 109 which runs on an OS is generally called a user-level process. As mentioned above, server program 109 executes a process according to a request from client program 121, which means that the server program may become the target of an attack from the network. On the other hand, a program which works as one function in an OS, such as the file I/O hook program 106 or the file system driver 107, is generally called a kernel level module; in many computer systems, an access control function is incorporated as an kernel-level module.

A virtual computer or a micro-kernel is available to enable two or more OSs to run simultaneously in a single information processing unit, such as server information processing unit 100 shown in FIG. 1. Alternatively, a method by which a real-time OS is installed as a kernel-level module for an ordinary OS and the real-time OS, upon detection of system trouble, automatically restarts the system while continuing real-time processing is disclosed in Japanese Published Unexamined Patent Application No. 11-24943, the entire contents of which are incorporated herein by reference for all purposes. A technique to implement inter-process communications between different types of OSs, like inter-OS communication processor 108, is disclosed in Japanese Published Unexamined Patent Application No. 1185546, the entire contents of which are incorporated herein by reference for all purposes. On the premise that these techniques are used for this invention, a further explanation of the embodiment is given below.

FIG. 2 shows the data structure of policy file 200. Reference numerals 210 to 212 show an example of a policy description. An object name 201 denotes the name of the file to which access should be restricted. The name of an object can be specified either on a per-file basis (as exemplified by 210 and 212) or on a per-directory basis (as exemplified by 211). To specify an object name on a per-directory basis, the directory name is followed by a file name expressed by given letters or symbols (e.g., an asterisk *). The type of access that is prohibited from being made to the object is listed as a prohibited access type 202. Error code 203 indicates an error code that is returned to the program as the access request source (subject) when one of the prohibited types of access 202 occurs. Exception subject 204 indicates the name of a program that has special authorization to access. The program hash value 205 is the feature value (hash value) for the program file specified as the exception subject, expressed, for example, by 8 bytes. User name 206 is the name of the user who can use the exception subject 204 (program), expressed as a user name or group name under the control of the service OS.

In other words, the policy implies that access is granted exception authorization only when a program having the hash value registered as hash value 205 for the program is registered as the exception subject and the program is used by the user or a member of the group whose name is registered as user name 206. Also, it implies that if these conditions are not met, the above-mentioned error code 203 is returned to the program as the access request source.

The policy file 200 should be configured by the security administrator of the system. For example, in order to prevent WWW contents such as HTML files from being illegally rewritten by an intruder, policy file 200 might describe a policy that write access to the HTML files is basically prohibited, and as an exception, write access is authorized only when the user appointed as the content administrator uses a specific HTML editing program.

It is important that a program vulnerable to attacks from the network, such as server program 109 not be specified as an exception subject. Furthermore, if the program to be registered as an exception program is stored in a removable storage medium such as CD-ROM and the medium is mounted only when needed, more careful protection can be given for further security. If a drive unit for the medium is added to the configuration shown in FIG. 1 and disk controller 112a is correlated with the drive unit, this kind of storage medium becomes usable.

FIG. 3 shows an example of the data structure of an access log file 300. Access log file 300 is a file in which an access log registration routine 406 in access control program 110 writes the fact that an access prohibited by policy file 200 has occurred. The file contains the following information: the date of access 301; the name of the object of access, i.e., the file to which access was attempted, 302; the type of access 303; the name of the subject, i.e., the program that issued the access request 304; and the user name 305, i.e., the user who was using the program when access was requested.

Figure 4:
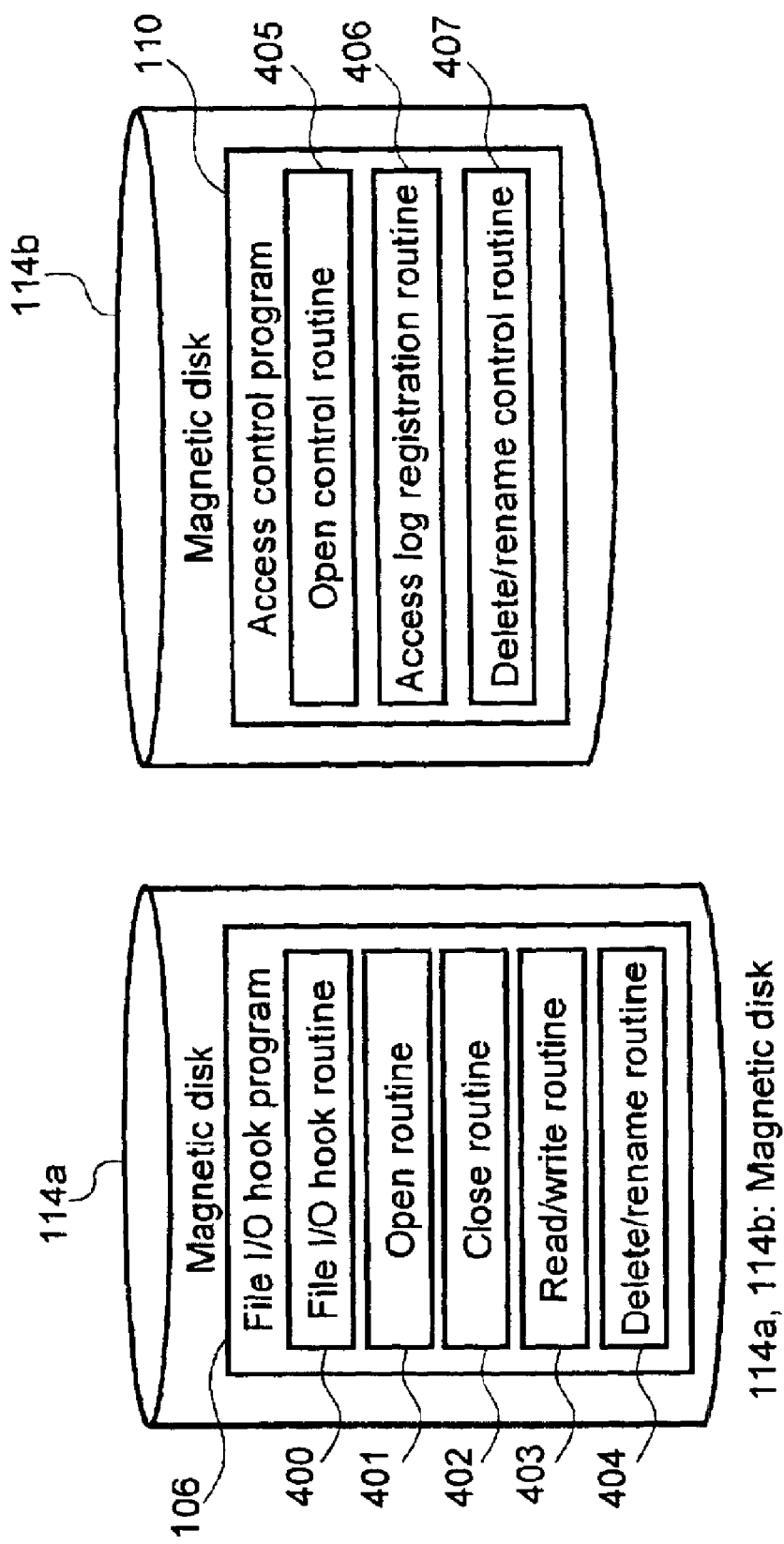
FIG. 4 is a block diagram showing a program routine which constitutes a file I/O hook program 106 and an access control program 110.
Figure 5:
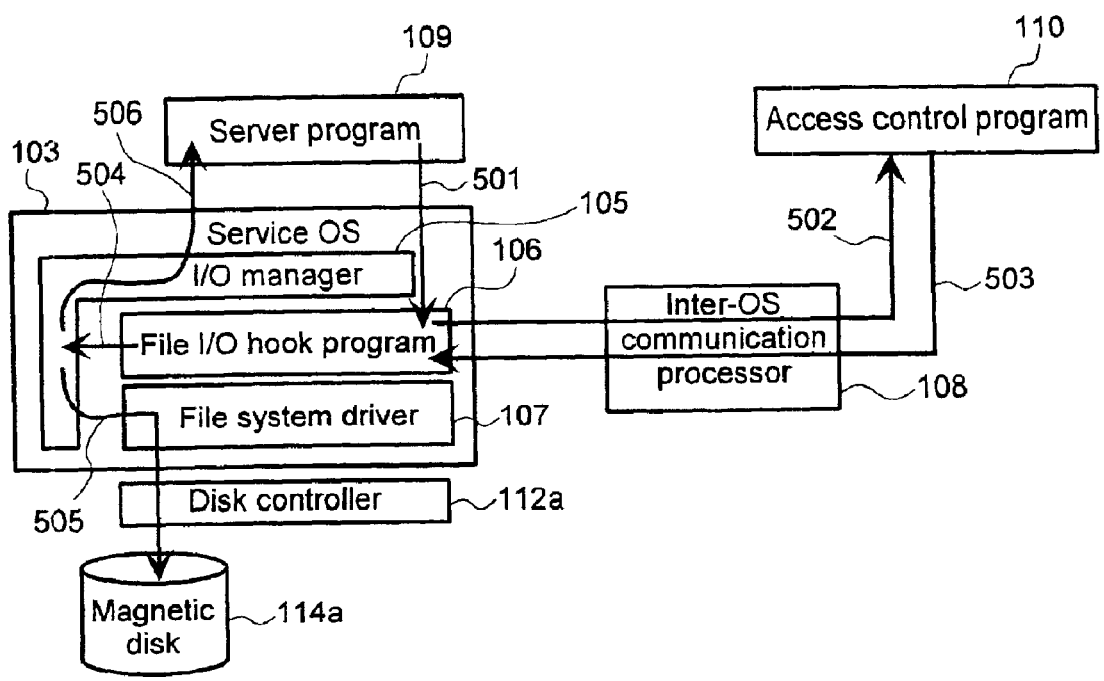
FIG. 5 is a block diagram showing communication routes through which data flows between modules according to an embodiment of the invention.
Figure 6:
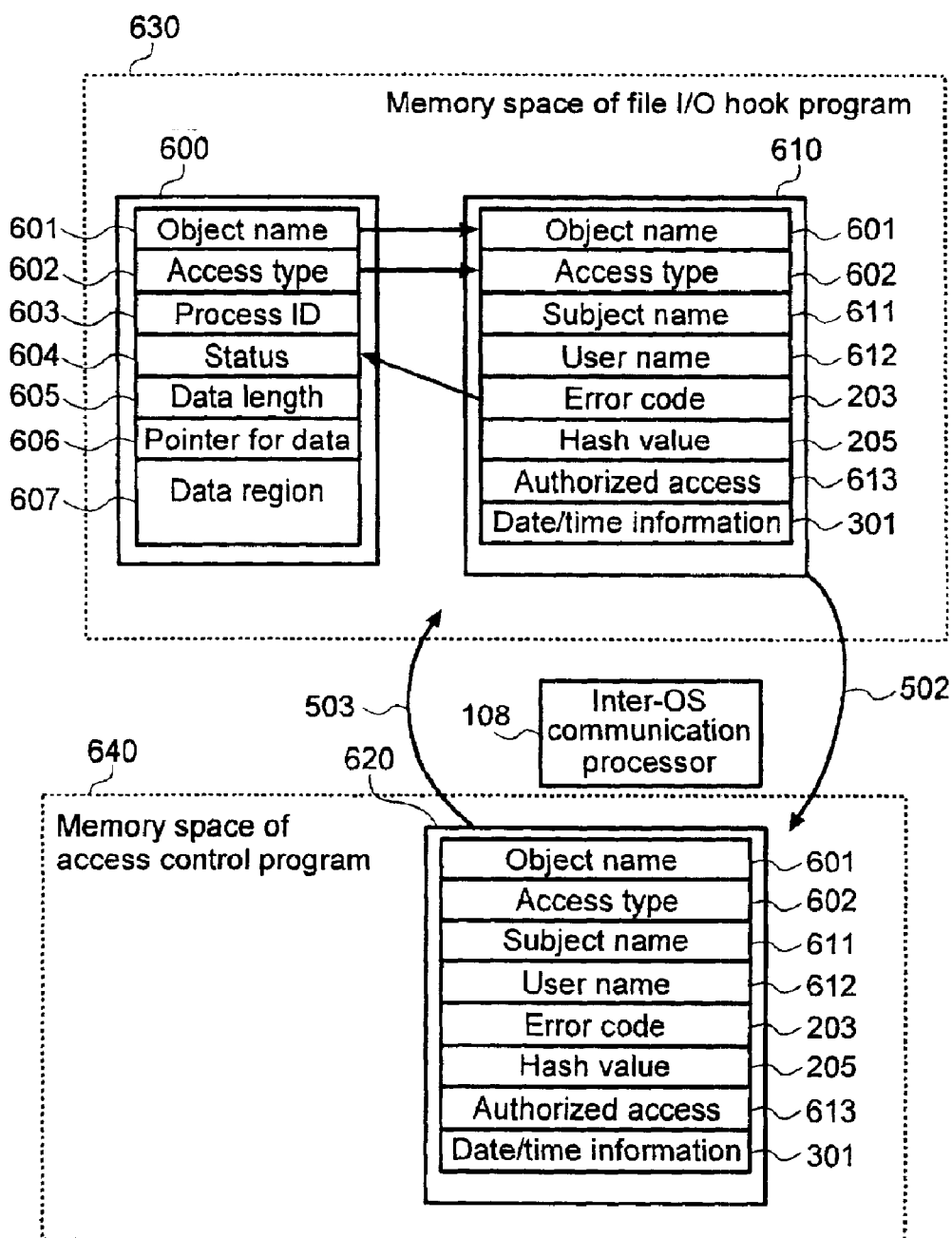
FIG. 6 is block diagram showing the structure of data which flows between modules according to an embodiment of the invention.

FIG. 4 shows the structures of file I/O hook program 106 and that of access control program 110. When server information processing unit 100 is started up, file I/O hook program 106 is loaded on memory 101 together with service OS 103, and access control program 110 is loaded on memory 102 together with security OS 104. Referring to FIGS. 5 and 6, the access control process according to this invention is described.

FIG. 5 shows how processing steps take place among the I/O manager 105, file I/O hook program 106 and access control program 110. Numeral 501 represents the communication route through which the file access request issued by server program 109 goes through I/O manager 105 to file I/O hook program 106. This route is commonly used for file accesses from all application programs running on service OS 103. Data in I/O packet 600 of FIG. 6 is transmitted to file I/O hook program 106. In this example, I/O packet 600 has passed through the access control system incorporated by the service OS before being transmitted to I/O hook program 106. However, it is also possible to require that the packet be checked by the access control program 110 before being subjected to a check in the access control system incorporated by the service OS.

FIG. 6 shows the structure of packet data which flows among the server, access control, and I/O hook programs. Numeral 601 denotes the name of the object which represents the file to be accessed. Numeral 602 represents the type of access to the object. Numeral 603 denotes the process ID of the program that issued the access request. Numeral 604 represents the status indicating a result of processing of the access request. Numeral 605 indicates the length of data related to the access. If the type of access 602 is a request for writing into a file, the data to be written is stored in data region 607 and the length of the data is stored as data length 605. Numeral 606 is the pointer for data region 607.

The following discussion refers to FIGS. 5 and 6, where numeral 502 shows a communication route used to request access control program 110 to conduct a check of access right or authorization for the file open request detected by file I/O hook program 106 and to write into access log 300 (shown in FIG. 3). The data structure of the request is expressed as a request packet 610 as illustrated in FIG. 6. Subject name 611 is the name of the program that issued the file access request, and user name 612 represents the user name and group name of the user using the program when the request was made. Subject name 611 and user name 612 can be obtained by specifying the process ID 603 included in the received I/O packet 600 and issuing a system call to a standard OS used as the service OS.

Request packet 610 can be transmitted when inter-OS communication processor 108 copies the data in the packet from a memory space 630 of the file I/O hook program to a memory space 640 of the access control program. The access control program 110 checks the data included in the received request packet against the content of the policy file 200 (shown in FIG. 2) and enters the check result in response packet 620 to transmit it to the file I/O hook program. As with communication route 502 described above, this transmission can be made when inter-OS communication processor 108 copies the data in the packet from memory space 640 of the access control program to memory space 630 of the file I/O hook program. Numeral 503 shows the communication route for this response packet.

From the contents of received response packet 620, file I/O hook program 106 determines whether the access should be authorized, and if the access is rejected, sets error code 203 for status 604 in I/O packet 600 and returns the I/O packet to I/O manager 105. When an error code is set for status 604, I/O manager 105 uses communication route 506 to return the error to server program 109 as the file access request source. On the other hand, if no error code is set for status 604, communication route 505 is used to continue file access to magnetic disk 114a through file system driver 107 and disk controller 112a, and communication route 506 is used to return the access result to server program 109.

Figure 7:
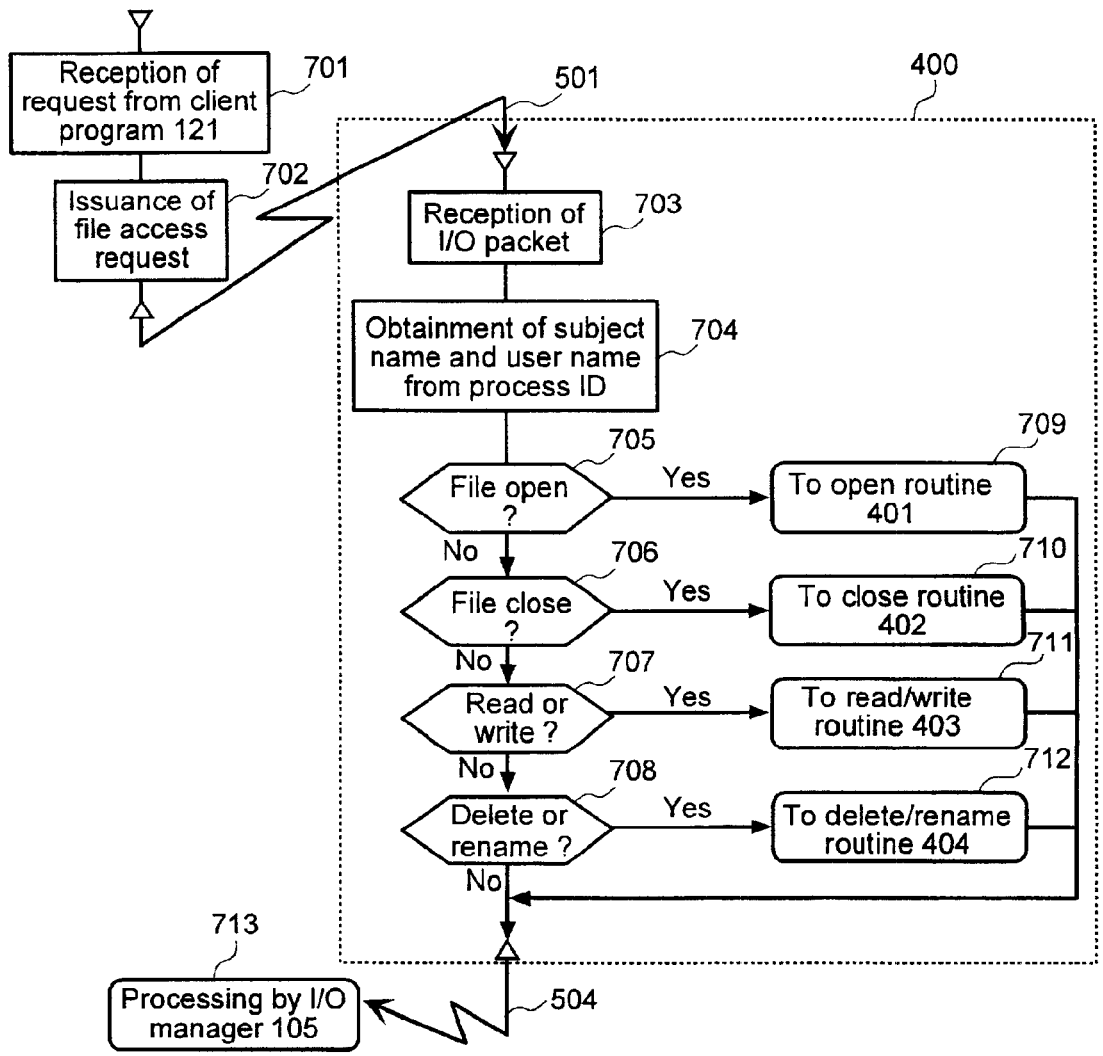
FIG. 7 is a flowchart for the process of file I/O hook routine 400.

Various processing sequences for access control according to this invention are explained referring to FIGS. 7 to 16. FIG. 7 is a flowchart showing the processing sequence for the file I/O hook routine incorporated in the file I/O hook program. In this example, server program 109 receives a request from client program 121 at step 701 and issues a file access (right) to service OS 103 according to the request at step 702.

The file access is transmitted via communication route 501 to file I/O hook routine 400 as I/O packet 600 (shown in FIG. 6), at step 703. Steps 703 to 712 represent the processing sequence for file I/O hook routine 400. At step 704, the subject name and user name of the file access request source are obtained from the process ID included in the I/O packet 600.

At steps 705 to 708, the access type 602 is checked and the processing routine corresponding to the access type (file open, file close, file read or write, or file delete or rename) is executed. If the access type is not any of these types or the corresponding processing routine has been executed, communication route 504 is used to return to step 713, processing by I/O manager 105.

Figure 8:
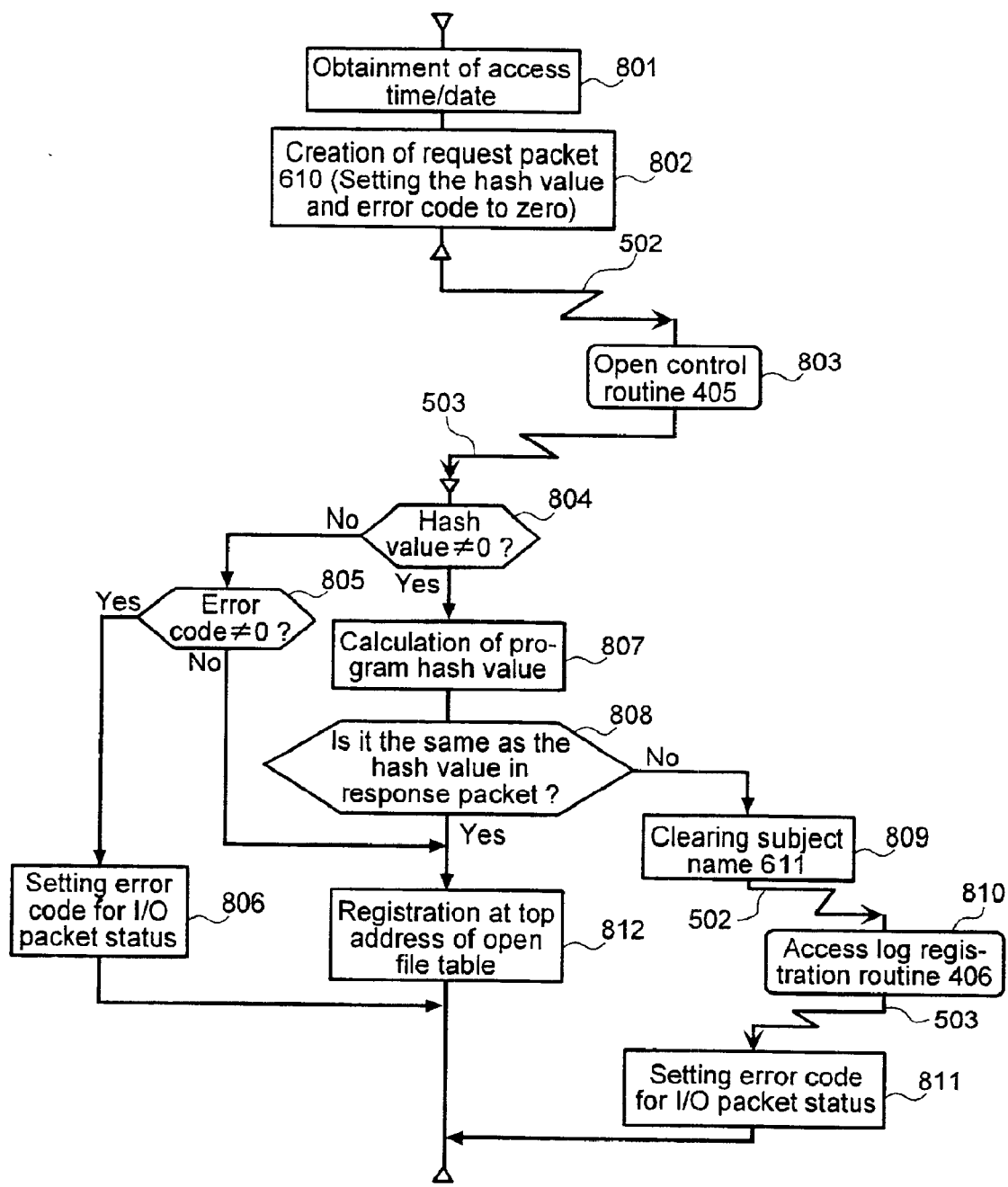
FIG. 8 is a flowchart for the process of open routine 401.

Referring to FIG. 8, the processing sequence for open routine 401 is explained. At step 801, the current date and time as access date and time are obtained. At step 802, a request packet 610 is created and the error code and hash value in this packet are set to zero (initial setting). Then, at step 803, open control routine 405 in the access control program is called, and request packet 610 (shown in FIG. 6) is transmitted to open control routine 405.

Figure 9:
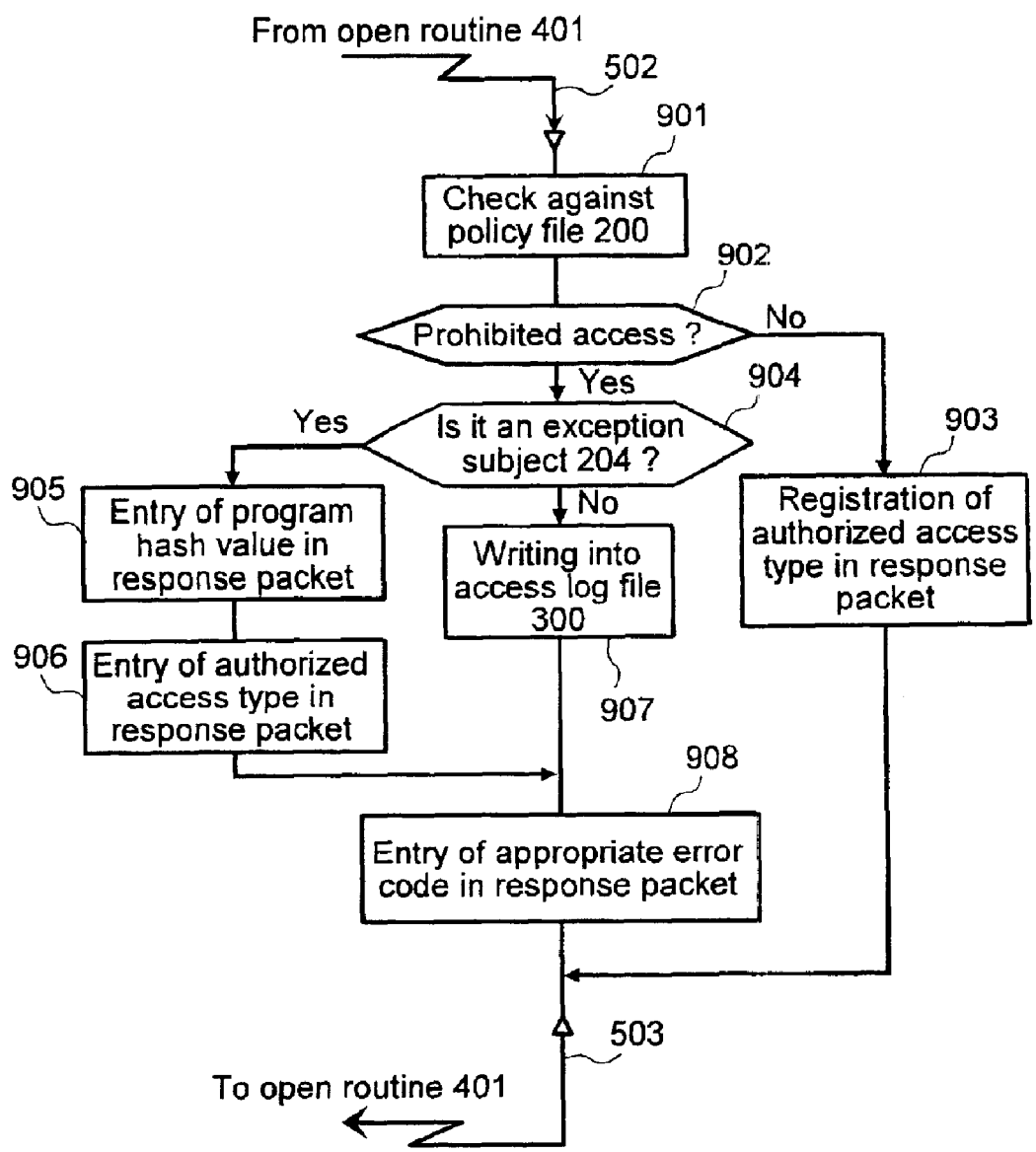
FIG. 9 is a flowchart for the process of open control routine 405.
Figure 10:
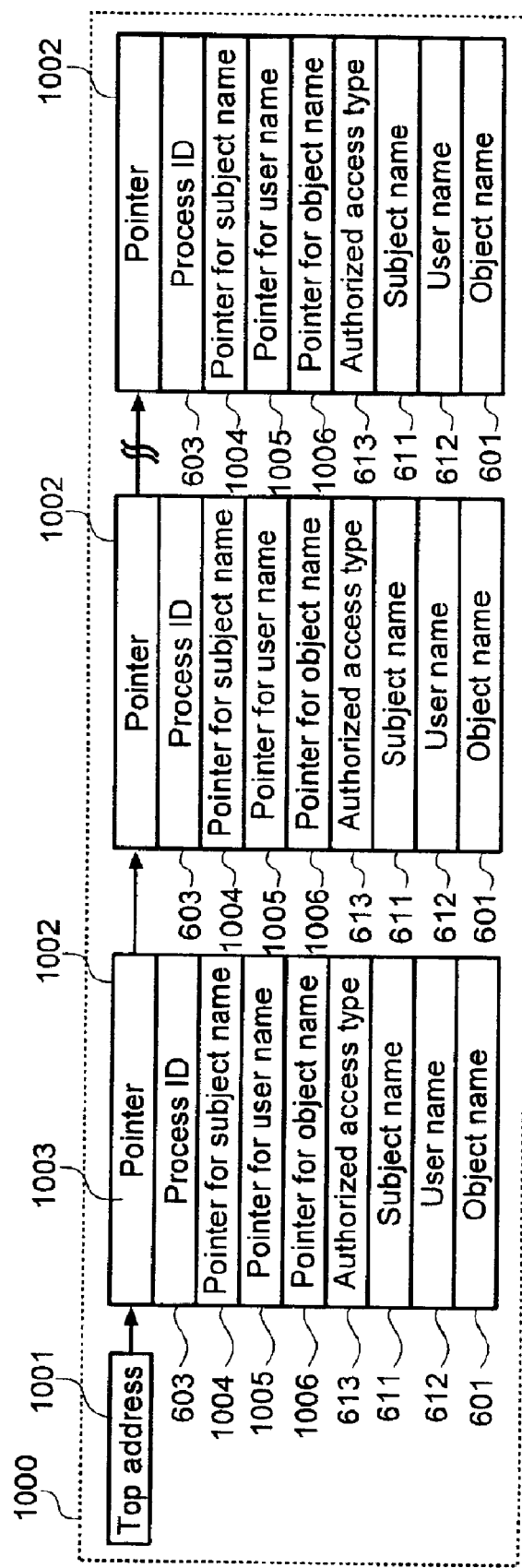
FIG. 10 is a block diagram showing the structure of an open file table and its list.

Referring now to FIGS. 6 and 9, the processing sequence for open control routine 405 is described. At step 901, information on the object name 601 and access type 602 in received request packet 610 is checked against policy file 200. At step 902, a determination is made as to whether the type of access is one registered as a prohibited access type. If it is a permitted access type, it is regarded as an authorized access and at step 903 is registered as authorized access 613 in response packet 620, before returning to open routine 401. In this example, an authorized access type means a type of access which can be executed from the program specified by subject name 611, and concerning read and write accesses for the file specified by object name 601. Regarding the file specified by object name 601, if both read and write accesses are authorized in policy file 200, both accesses are registered as authorized accesses 613. If only the read access is authorized, only the read access is registered as authorized access 613, and if only the write access is authorized, only the write access is registered. To prohibit both read and write accesses, prohibition of opening the file must be described beforehand in the policy file 200.

If the access is deemed prohibited at step 902, a decision is made at step 904 about whether subject name 611 is an exception subject 204 and user name 612 is a user name 206 listed in policy file 200. Whether the subject name completely conforms to the pathname for the program file is determined. Further, a determination is made whether the user name conforms to either the user name or group name included in user name 612. If subject name 611 and user name 612 conform to exception subject 204 and user name 206, respectively, hash value 205 for the program file is obtained from policy file 200 and registered in response packet 620 at step 905. At step 906, as at step 903, the authorized access type is registered as authorized access 613 in response packet 620. Then, at step 908, the appropriate error code 203 is registered in response packet 620 before returning to open routine 401. This error code registration is important at steps 804–812 in open routine 401.

If it is determined that the above-the names do not conform to exception subject 204 and user name 206 at step 904, the content of the access is written in access log file 300 at step 907. Then, at step 908, the appropriate error code 203 is registered in response packet 620 before returning to open routine 401.

At step 804 in FIG. 8, the hash value in the response packet is checked. If it is zero, the access is not an authorized exception, and, at step 805, the error code is checked. If it is not zero, the access is a prohibited one, and, at step 806, an error code is registered as the I/O packet status. This concludes the sequence. However, if the error code is zero at step 805, the access is valid, and, at step 810, the access information concerned is registered at the top address of the open file table, discussed with FIG. 10, later, which concludes the sequence.

If the hash value at step 804 is not zero, the subject is authorized as an exception, and, at step 807 the hash value for the program file specified by the subject name is calculated and, at step 808, the calculated hash value is compared with the hash value in the response packet. If they are the same, the subject is regarded as an exception subject and, at step 812, the access information is registered at the top address of the open file table and the sequence for this routine is ended. If the hash values are not the same, the program file is an unauthorized program, and, at step 809, the subject name 611 in the request packet is changed, for example, to null data so that it does not become an exception subject. At step 810 access log registration routine 406 is called and the request packet is transmitted to the access log registration routine.

The processing sequence for access log registration routine 406 is explained with reference to FIGS. 8 and 14. At step 1401, the content of the request packet is checked against policy file 200. If the subject name 611 is cleared in advance at step 809 in order to avoid treatment as an exception subject, as just described, this access is always treated as a prohibited open access. At step 1402, the appropriate error code is read from policy file 200 and registered in the response packet, and the packet is returned. At step 1403, the content of the access is written in access log file 300 before returning to open routine 401.

In open routine 401 as shown in FIG. 8, error code 203 in the response packet is registered as the I/O packet status at step 811, which concludes the sequence for this routine. The open file table is explained referring to FIG. 10. The open file table 1000 is a set of structured data 1002 that stores information on files which are currently open. One structure stores information on one open file and in the file I/O hook program. Each structure is controlled as a list by means of top address 1001 and pointer 1003. An example of open file table 1000 is shown in FIG. 11.

If the access conforms to the information registered in open file table 1000, it is important to protect open file table 1000 from being illegally rewritten, since the access is authorized. When an OS in which an independent memory space is allocated to each process and a memory space exclusive control system is used as the service OS, open file table 1000 can be protected from being illegally rewritten by another process.

Figure 12:
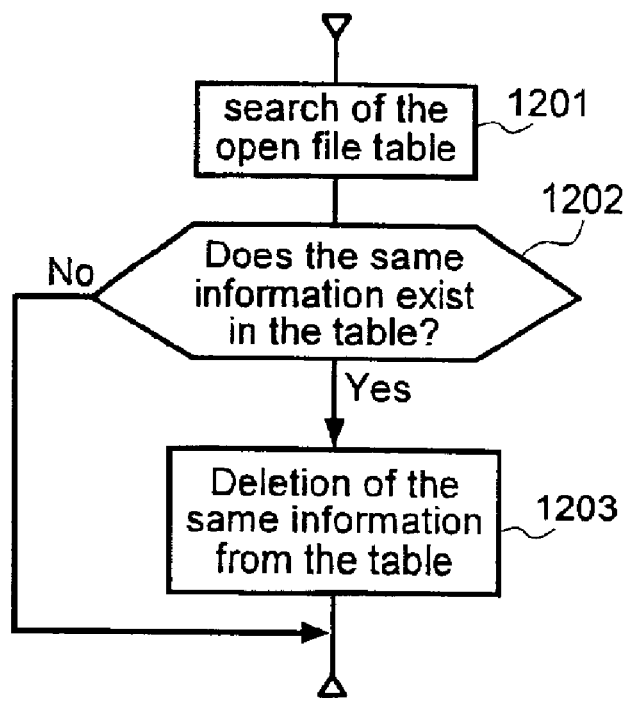
FIG. 12 is a flowchart for the process of close routine 402.

FIG. 12 shows the processing sequence for close routine 402. At step 1201, the open file table is searched for the same combination of object name and process ID that is in the received I/O packet, and for the subject name and user name obtained from the process ID. If the same information is found in the table at step 1202, it is deleted from the table at step 1203. If the same information does not exist in the table, the request is treated as a request to close a file unregistered in the policy file, and thus the sequence for this routine is ends.

Figure 13:
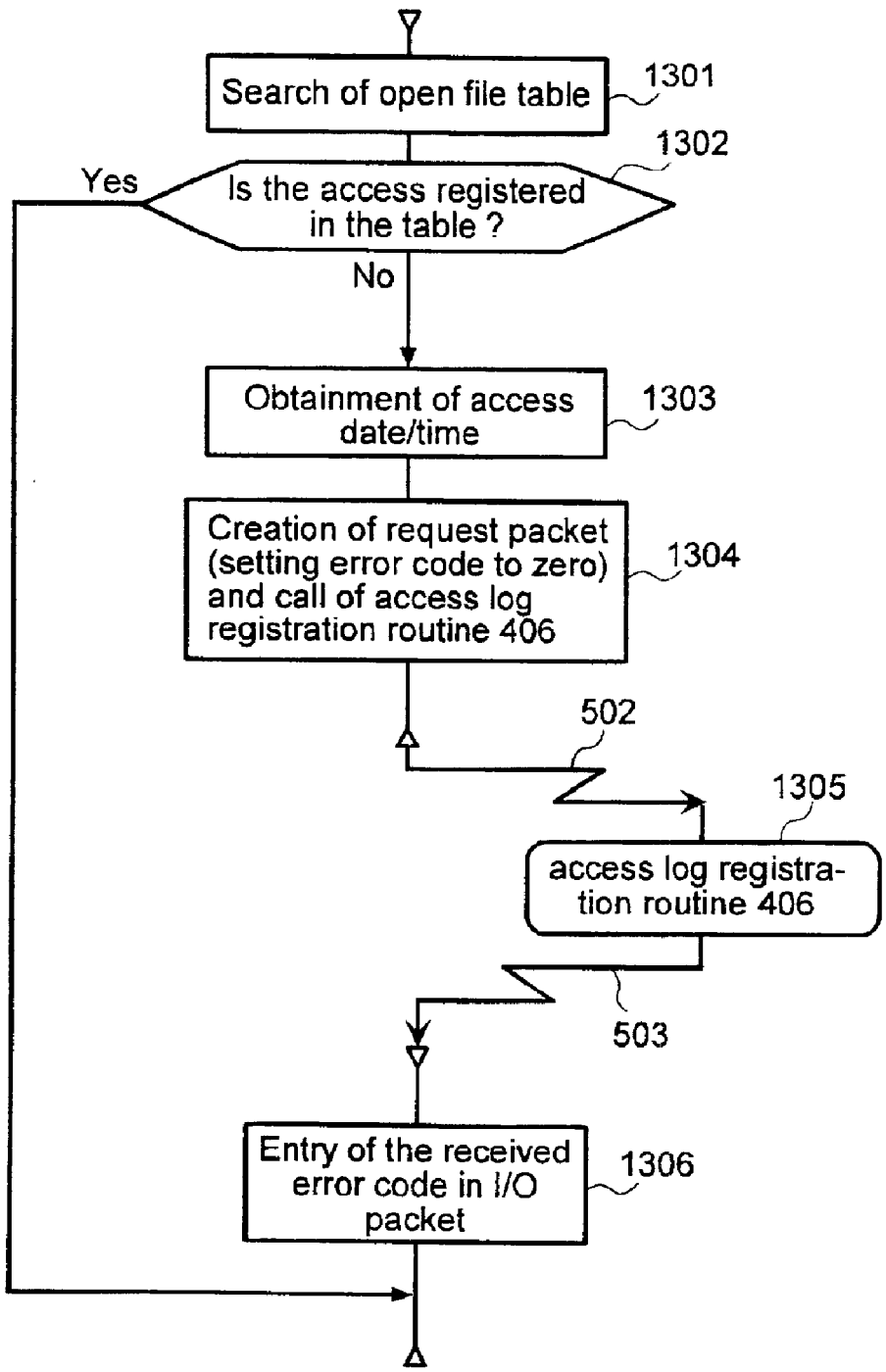
FIG. 13 is a flowchart for the process of read/write routine 403.

FIG. 13 shows the processing sequence for read/write routine 403. At step 1301, the open file table 1000 (shown in FIG. 10) is searched for the same combination of object name 601 and process ID 603 that is in the received I/O packet, and for the subject name 611 and user name 612 obtained from the process ID 603. The access type is checked against the authorized access types. If the same combination of object name 601, process ID 603, subject name 611, user name 612, and access type 602 is found in table 1000 at step 1302, the processing sequence for this routine ends. This means that if the access is found as registered in open file table, it is treated as an authorized access and no processing is performed by the access control program. This reduces system performance deterioration which might be caused by the access control based on this invention.

If the access is found to be unregistered in the open file table at step 1302, it is regarded as prohibited by the policy file; the access time and date are obtained at step 1303, and a request packet is created at step 1304. Here, the error code is set to zero as an initial value. Then, the sequence jumps from step 1305 to the access log registration routine 406.

Figure 14:
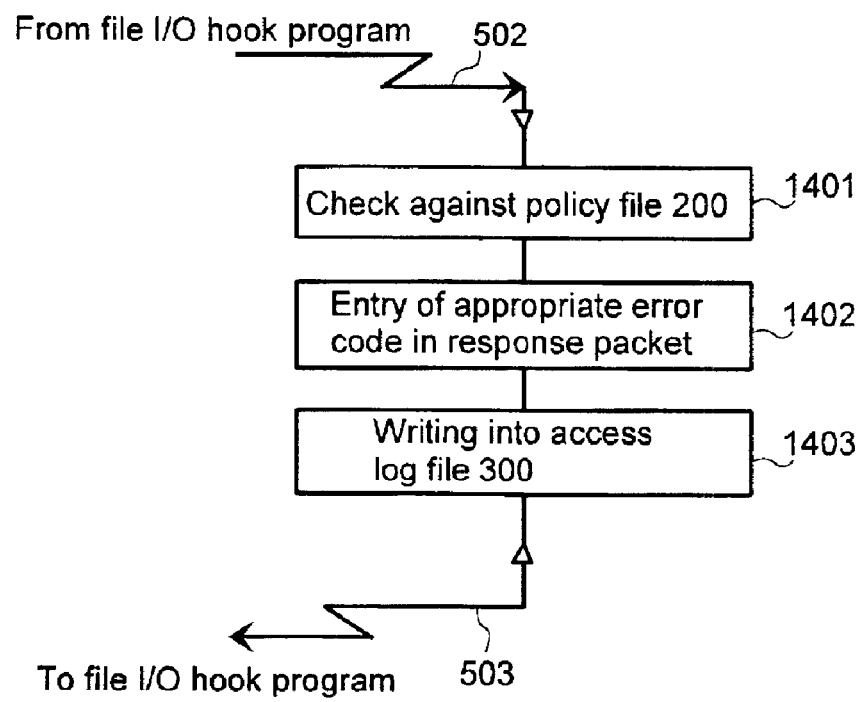
FIG. 14 is a flowchart for the process of access log registration routine 406.

In access log registration routine 406 as shown in FIG. 14, the content of the request packet is checked against the policy file 200 at step 1401, and the appropriate error code is read from policy file 200 and registered in the response packet. Then, the content of the access is written in access log file 300 before returning to the read/write routine 403. In the read/write routine 403, the received error code in the response packet is set for the status 604 in the I/O packet at step 1306 as shown in FIG. 13, which concludes this routine.

Figure 15:
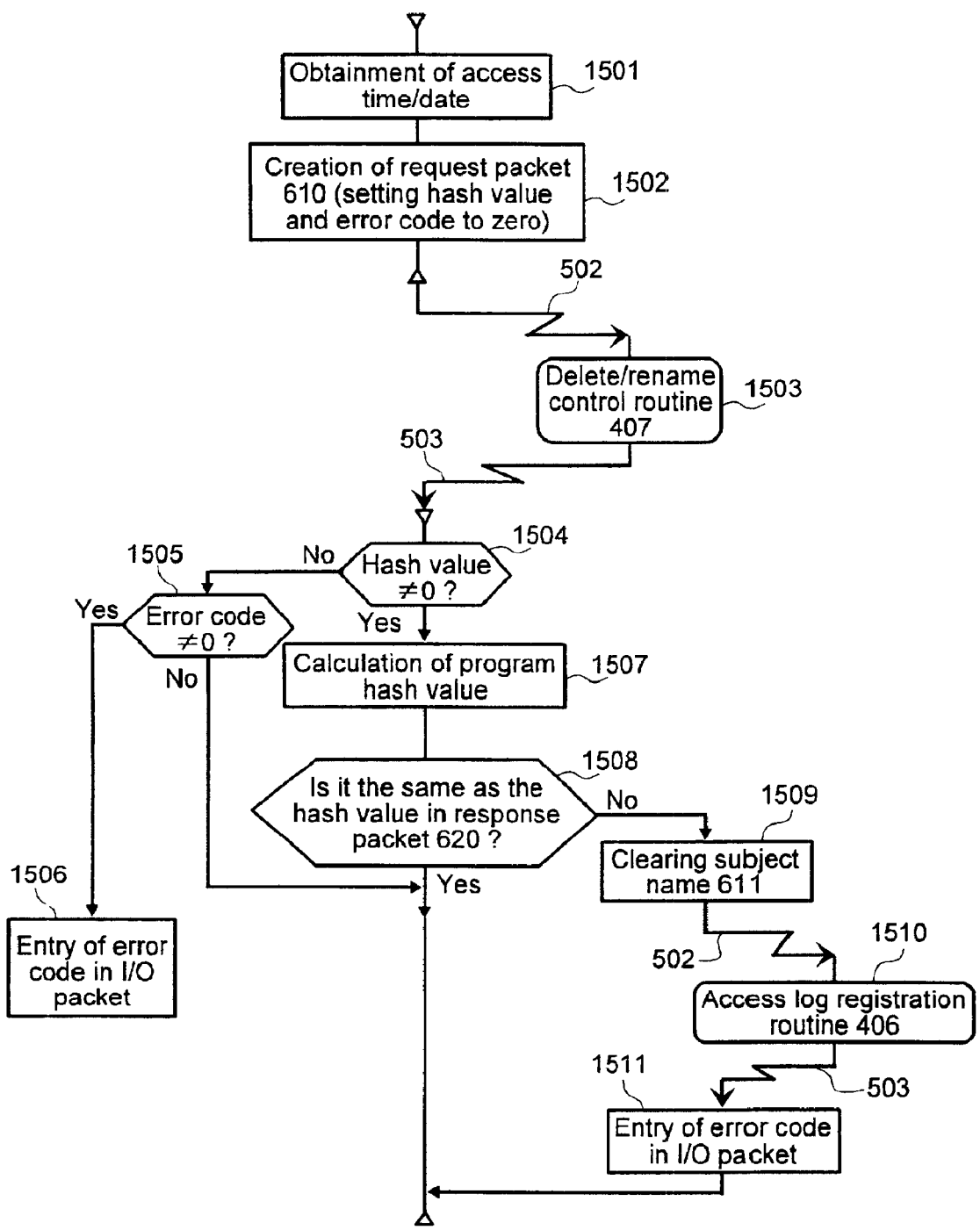
FIG. 15 is a flowchart for the process of delete/rename routine 404.
Figure 16:
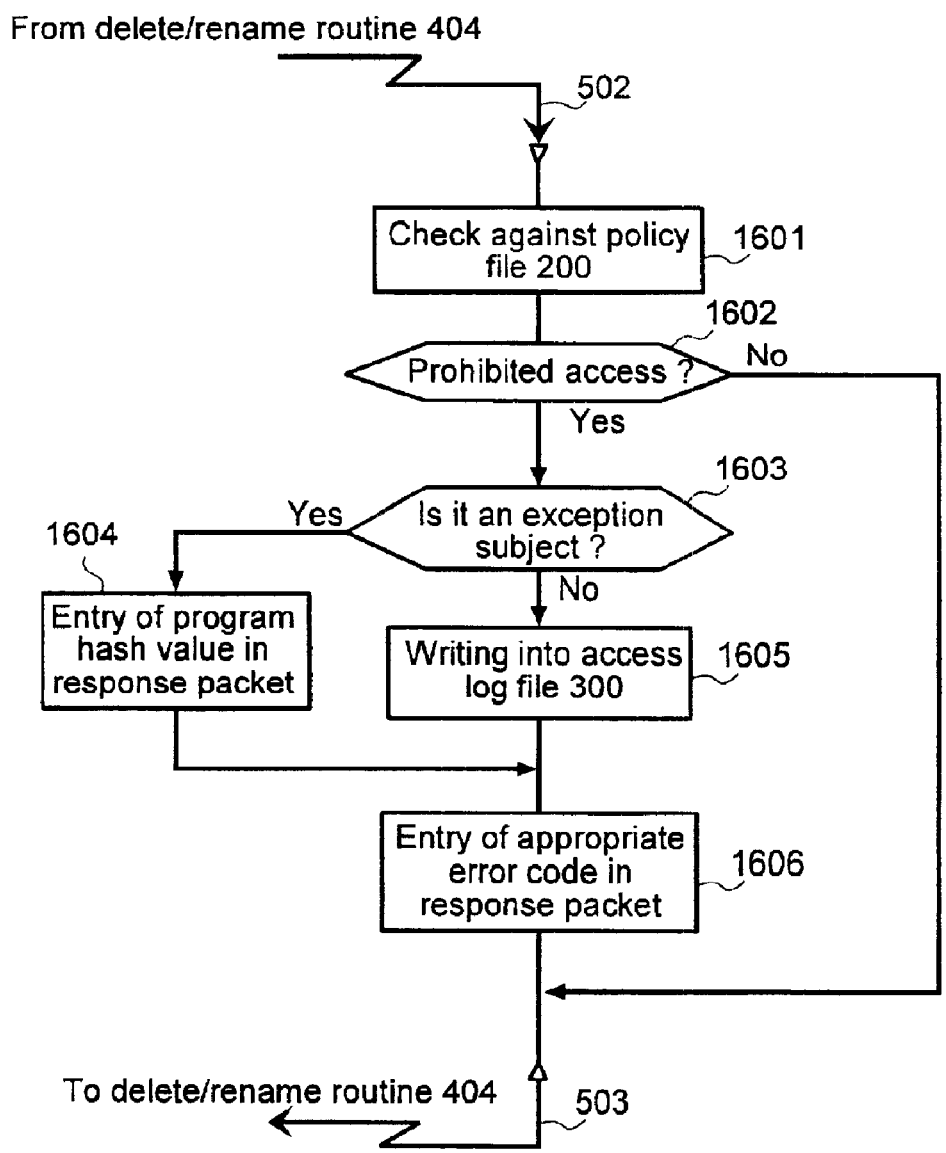
FIG. 16 is a flowchart for the process of delete/rename control routine 407.

Referring now to FIG. 15 the processing sequence for delete/rename routine 404 is described. Here, steps 1501, 1502, 1504, 1505 and 1507–1510 are the same as steps 801, 802, 804, 805, and 807–810 of open routine 401 shown in FIG. 8. At step 1501, the current date and time as access date and time are obtained. At step 1502, a request packet 610 is created and the error code and hash value in this packet are set to zero (initial setting).

At step 1503, the delete/rename control routine 407 in the access control program is called and the above-the request packet 610 is transmitted to the delete/rename control routine. The processing sequence for delete/rename control routine 407 is explained referring to FIG. 16. Step 1601 is the same as the step 901 as shown in FIG. 9. At step 1602, a determination is made as to whether the type of access is registered as prohibited. If it is not a prohibited access type, it is regarded as an authorized access and the process returns to delete/rename routine 404.

If the access is deemed prohibited at step 1602, a decision is made at step 1603 whether the subject name is an exception subject 204, and whether the user name is the user name listed in policy file 200. Note that steps 1603 and 1604 are the same as steps 904 and 905 (FIG. 9). Whether the subject name completely conforms to the path name for the program file is determined. Further, a determination is made of whether the user name conforms to either the user name or group name included in the user name. If the subject name and user name conform exception subject 204 and the user name, respectively, the hash value for the program file is obtained from policy file 200 and registered in the response packet at step 1605 (which corresponds to step 907 in FIG. 9).

If the subject name and the user name do not conform to exception subject 204 and the user name in policy file 200, at step 1603, the content of the access is written in access log file 300 at step 1605. Then, at step 1606, the appropriate error code is registered in the response packet 620 before the sequence returns to delete/rename routine 404.

Returning now to FIG. 15, the hash value in the response packet is checked at step 1504. If the hash value is zero, the access is not an authorized exception, and, at step 1505, the error code is checked. If the error code is zero, it is regarded as an authorized access, the error code is registered in the I/O packet at step 1506, and the processing sequence for this routine is ended. If the hash value at step 1504 is not zero, the hash value for the program file specified by the subject name is calculated at step 1507, and the calculated hash value is compared with the hash value in response packet 620 at step 1508. If they are the same, the subject is regarded as an exception subject 204 and the sequence for this routine is ended. If they are not the same, the subject name 611 in the response packet is changed at step 1509 so that it does not become an exception subject. Access log registration routine 406 is called at step 1510, and at step 1511 error code 203 is set for status in the I/O packet. After this routine is finished, the process returns to delete/rename routine 404, concluding the sequence for this routine.

Some types of file system incorporated in operating systems include additional information on the desired access type in the I/O packet representing a file open request. In other words, whether the open request is made either to read the file or to read/write the file can be detected from the access type 602 in I/O packet 600. Assuming that this kind of file system is used, it is possible to realize an access control system that does not require management of open file table 1000 by modifying the sequences for file I/O hook routine 400, open routine 401, and open control routine 405.

To achieve this, the processing sequence for file I/O hook routine 400 as shown in FIG. 7 is modified by removing steps 706, 707, 710 and 711. In other words, the sequence for file I/O hook routine 400 is modified so that the type of access (a file open request or a file delete request or a file rename request) is detected and if it is a file open request, the process goes to the open routine 401 at step 709, or if it is a delete or rename request, the process goes to the delete/rename routine 404 at step 712.

The sequence for open routine 401 in FIG. 8 is modified by removing step 812. In other words, the sequence for open routine 401 is modified so that as a result of hash value check at step 808, if the hash values are the same, the sequence for this routine ends.

Figure 17:
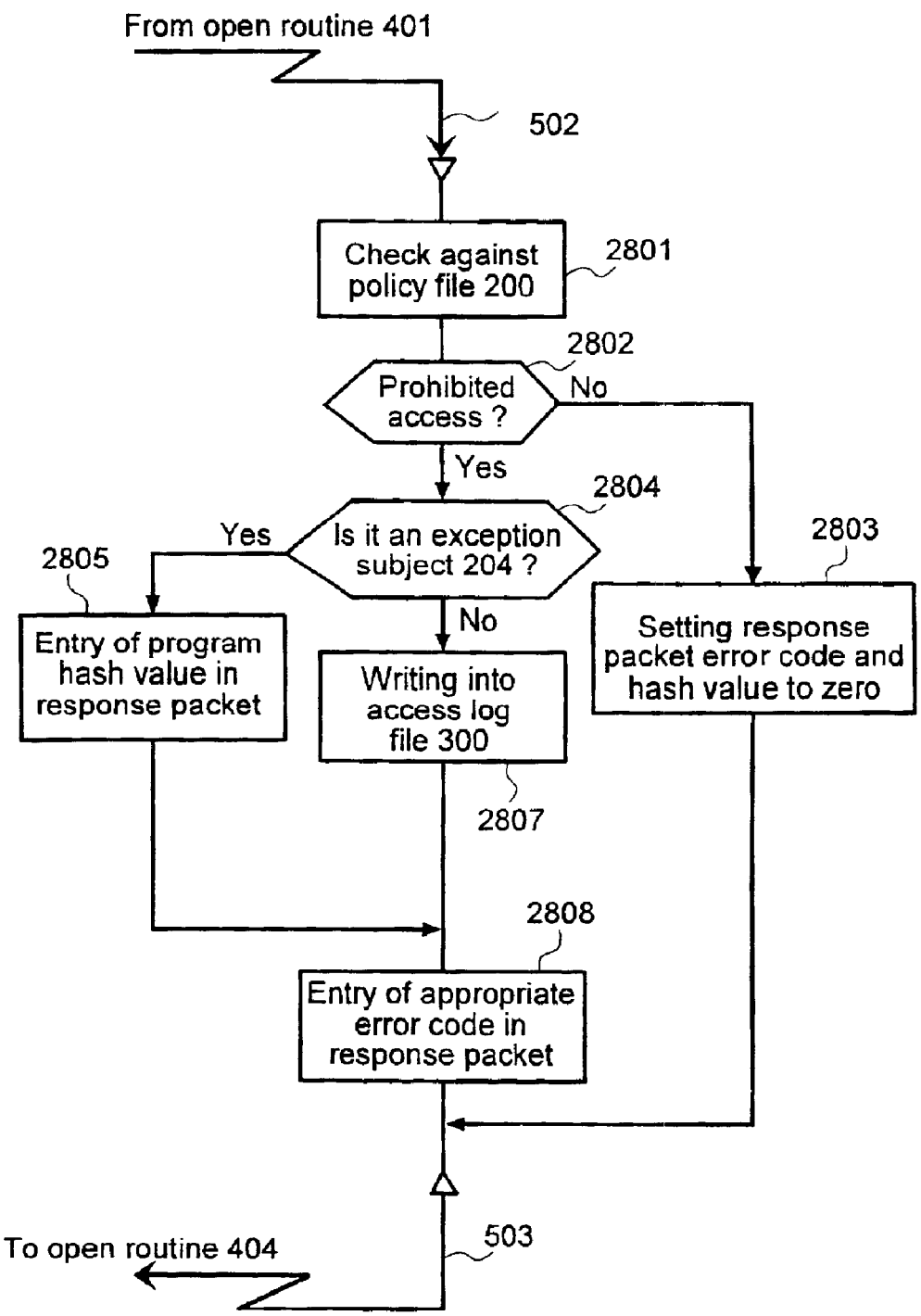
FIG. 17 is a flowchart for the process of open control routine 405 according to another embodiment.

The sequence for open control routine 405 in FIG. 9 is replaced by another sequence shown in FIG. 17. At step 2801, when the information on the object name and the access type in the received request packet is checked against policy file 200, additional information (read/write access) from open request included in the access type information is also obtained and checked against policy file 200. In this embodiment of the invention, when additional information about the open request includes both read and write accesses, if either the read access, the rite access, or both are described as prohibited accesses in policy file 200, the related open request is regarded as a prohibited access.

At step 2802, a decision is made as to whether or not the access type is registered as prohibited. If it is not a prohibited access type, it is regarded as an authorized access and at step 2803 the error code and the hash value in the response packet are both set to zero and the process returns to the open routine 401. If both the read and write accesses are to be prohibited, policy file 200 should include a description to prohibit opening the file.

If, at step 2802, the access is found to be prohibited, a determination is made at step 2804 of whether the subject name and the user name respectively conform to exception subject 204 and user name listed in policy file 200. The subject name is checked for complete conformance to the pathname. The user ame is checked for conformance to either the user name or the group name included in the user name 612. If it is found that the subject name and user name conform to exception subject 204 and to the user name, respectively, the hash value for the program file is obtained from policy file 200 and set in the response packet at step 2805. Then, at step 2808, the appropriate error code is registered in the response packet and the process returns to the open routine.

If nonconformance to the exception subject 204 and the user name is found at step 2804, the content of the access is written in access log file 300 at step 2807. Then, the appropriate error code is registered in the response packet at step 2808 and the process returns to the open routine 401. As discussed, this invention offers the advantage that even if an intruder pretends to be a user who has great authority, like an OS administrator, access to the file can be prevented. In addition, another advantage of the invention is to prevent illegal file accesses which could not be prevented with the technique of periodically checking the file for changes, as mentioned earlier.

A further advantage of the invention is that the policy file describing access rights to the respective contents, which is used by the access controller, can be protected from illegal accesses or attacks from outside. In addition, if a firewall is added to a communication line, like LAN 115, connecting the server information processing unit and client information processing units in the system as shown in FIG. 1 according to the invention, greater security can be achieved.

According to this invention, files and information under the control of information processing units can be protected from illegal or unauthorized accesses. Each of the programs required to implement the embodiments described above may be preloaded or loaded when necessary via a computer-readable medium from equipment or another server, i.e., as transmission signals on the network, or via a portable storage medium such as CD-ROM.

The specification and drawings are, accordingly, to be regarded as illustrative rather than restrictive. It will, however, be evident to those skilled in the art that various modifications and changes may be made thereto without departing from the broader spirit and scope of the invention as set forth in the claims.

The preceding has been a description of the preferred embodiment of the invention. It will be appreciated that deviations and modifications can be made without departing from the scope of the invention, which is defined by the appended claims.

What is claimed is:

1. An access control system comprising:
   a memory which stores necessary information for various processes;
   a processor for input/output to a file stored in a storage medium;
   a policy file in said memory in which access control policy for said file is described;
   an access controller which determines the validity of a request for access to said file according to said access control policy;
   a monitoring processor which monitors issuance of a file access request made by means of said input/output processor, notifies said access controller of an issued file access request and receives the result of validity determination from said access controller; and
   an exclusive controller which protects said memory's storage regions in use by said input/output controller, access controller and monitoring processor and shields said policy file from an access execution processor other than said input/output controller, access controller and monitoring processor, wherein:
   said policy file contains information as an access control policy to identify the access request source, access execution processor and access type for the file to be accessed; and
   said monitoring processor uses information to identify the access request source, access execution processor and access type to notify said access controller of said issued file access request.

2. The access control system as defined in claim 1, wherein said access control policy comprises information on an access type prohibited for access to said file, and information to identify the access execution processor and access request source which are authorized by exception to access the file.

3. The access control system as defined in claim 2, wherein the access execution processor described in said access control policy is a program and is identified by a combination of the program's pathname and feature value.

4. The access control system as defined in claim 3, said system having an access log file which registers the content of a file access request, wherein
   said access controller checks said file access request against the description of said policy file and transmits the result of said validity determination to said monitoring processor; and
   if said access request is authorized, transmits the feature value of said access execution processor to said monitoring processor; or
   if said access request is contrary to said access control policy, registers the content of said file access request in said access log file.

5. The access control system as defined in claim 4, wherein the system also incorporates an open file table as well as a processor that, if the access type of a valid file access request is an open access, registers, in said open file table, the access type, the file to be accessed and the access request source, and information to identify the access execution processor, which are obtained as response information from said access controller; and a processor that, if said access request is a read or write request, searches said open file table and determines the validity of said access request.

6. The access control system as defined in claim 5, wherein said monitoring processor also has a processor that, upon detecting a read or write access request not registered in said open file table, registers the content of said access request in said access log file through said access controller.

7. The access control system as defined in claim 6, wherein said monitoring processor also has a processor that, upon detecting a file close request, deletes the corresponding information from said open file table.

8. The access control system as defined in claim 4, wherein said access controller performs said check of the access request attribute information against the description in the policy file if the access type of said file access request is an open access and the attribute information for the file access request includes information on read access or write access.

9. The access control system as defined in claim 8, wherein said monitoring processor also has a processor that, if said file access request is valid, calculates the feature value for said access execution processor and compares it with the feature value received from said access controller; and a processor that, if the values are the same, authorizes said access request; and a processor that, if the values are not the same, invalidates said file access request and registers the content of the file access in said access log file through said access controller.

10. A program product comprising programs which are loaded and executed in an information processing unit provided with a processor for input/output to files and a memory for storing said files and constitute an access control system on said information processing unit, and files which are used by said programs, the product having the following:

a policy file in which an access control policy is described; an access control program, a monitoring program; and a computer-readable medium to embody said programs; wherein said access control policy contains information to identify the access request source, access execution processor and access type for the file to be accessed; and said access control program has codes to enable said information processing unit to determine the validity of the file access request according to said access control policy; and said monitoring program has codes to enable said information processing unit to monitor issuance of a file access request made by means of said input/output processor as well as codes to enable said information processing unit to notify said access control program of the issued file access request using the information to identify the access request source, access execution processor and access type.

11. The access control system as defined in claim 2, wherein said access control policy further comprises an error code which is returned to the access request source if said prohibited type of access occurs.

* * * * *